(12) United States Patent
Birman et al.

(10) Patent No.: US 7,607,808 B2
(45) Date of Patent: Oct. 27, 2009

(54) INSTRUMENT PANEL HOUSING WITH LIGHT DIFFUSER

(75) Inventors: Vyacheslav B. Birman, Rochester Hills, MI (US); Werner Eckardt, Rochester, MI (US); Christian Jean Tanguy, Sterling Heights, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 472 days.

(21) Appl. No.: 11/126,033

(22) Filed: May 10, 2005

(65) Prior Publication Data

US 2005/0281040 A1    Dec. 22, 2005

Related U.S. Application Data

(60) Provisional application No. 60/581,173, filed on Jun. 16, 2004.

(51) Int. Cl.
*B60Q 1/26* (2006.01)

(52) U.S. Cl. ............................ 362/489; 362/23; 362/28; 362/30; 362/482; 362/223

(58) Field of Classification Search ................. 362/489, 362/23, 28, 29, 30, 223, 242, 245, 246, 298, 362/307, 471, 482
See application file for complete search history.

(56) References Cited

U.S. PATENT DOCUMENTS

| | | | | | |
|---|---|---|---|---|---|
| 2,795,069 | A | * | 6/1957 | Hardesty | ..................... 40/546 |
| 3,793,514 | A | * | 2/1974 | Curl | ............................ 362/632 |
| 5,934,782 | A | * | 8/1999 | Atkins et al. | ................... 362/26 |
| 6,025,820 | A | * | 2/2000 | Salmon et al. | ............. 345/75.1 |
| 6,070,549 | A | * | 6/2000 | Iuchi et al. | ................... 116/287 |
| 6,238,076 | B1 | | 5/2001 | Pascale et al. | |
| 6,302,551 | B1 | * | 10/2001 | Matumoto | .................... 362/27 |
| 6,595,667 | B1 | * | 7/2003 | Obata | .......................... 362/489 |
| 6,846,101 | B2 | | 1/2005 | Coushaine | |
| 6,974,220 | B2 | * | 12/2005 | Birman et al. | ................. 362/26 |
| 7,048,397 | B2 | * | 5/2006 | Birman | .......................... 362/26 |
| 2004/0057252 | A1 | | 3/2004 | Coushaine | |

FOREIGN PATENT DOCUMENTS

| | | |
|---|---|---|
| EP | 0 736 416 A1 | 10/1996 |
| EP | 1 126 209 A2 | 8/2001 |
| EP | 1 132 721 A1 | 9/2001 |
| FR | 2 628 823 A1 | 9/1989 |

OTHER PUBLICATIONS

International Search Report, Oct. 7, 2005.

* cited by examiner

*Primary Examiner*—Sandra L O'Shea
*Assistant Examiner*—Jessica L McMillan

(57) ABSTRACT

A light distributing assembly for a vehicle instrument panel includes a light source that emits light in a first direction. A first surface that is transverse to the first direction receives the light and changes the direction of the light to a second direction. A vehicle instrument panel housing having a second surface receives the light from the first surface and reflects a portion of the reflected light toward a vehicle display surface to illuminate the vehicle display surface.

12 Claims, 3 Drawing Sheets ically aspects of this invention. The scope of legal protection given to this invention can only be determined by studying the following claims.

INSTRUMENT PANEL HOUSING WITH LIGHT DIFFUSER

CROSS-REFERENCE TO RELATED APPLICATIONS

The application claims priority to U.S. Provisional Application No. 60/581,173, filed on Jun. 16, 2004.

BACKGROUND OF THE INVENTION

This invention relates to vehicle instrument panel lighting and, more particularly, to a light distributing assembly that evenly disperses light to illuminate a vehicle display graphic.

Vehicle instrument panels often include a vehicle display that communicates information, such as a speed of the vehicle, to an occupant of the vehicle. A typical vehicle display includes an ink printed display surface supported by a housing. The housing also supports a printed circuit board having several light sources that illuminate the printed display surface.

Disadvantageously, portions of the display surface that are near one of the light sources may appear to the vehicle occupant to be brightly illuminated, while portions that are remote from one of the light sources may appear to be dimmer. This difference in illumination levels provides an undesirable appearance to the instrument panel and may detract from the appearance of quality of the vehicle. One proposed solution includes using additional light sources to provide additional illumination for the remote portions. However, this solution adds expense to the instrument panel and requires additional space on the printed circuit board and in the housing.

Accordingly, there is a need for a light distributing assembly that utilizes a single light source to uniformly illuminate the vehicle display.

SUMMARY OF THE INVENTION

An example light distributing assembly for a vehicle instrument panel according to the present invention includes a light source that emits light in at least a first direction. A first surface that is transverse to the first direction receives the light and changes the direction of the light to a second direction. A vehicle instrument panel housing includes a second surface that receives light from the first surface and reflects at least a portion of the reflected light toward a vehicle display surface to illuminate the vehicle display surface.

In another example, a light distributing assembly includes a circuit board and a light source in electrical communication with the circuit board that emits light in a first direction. A vehicle display surface illuminates in response to light received from the light source. A vehicle instrument panel housing having a first surface reflects at least a portion of the light toward the vehicle display surface. A diffuser member between the light source and the vehicle display surface receives the light from the light source and changes the direction of the light to a second direction toward the first surface.

Accordingly, this invention provides substantially uniform illumination of an instrument panel using a single light source while avoiding the shortcomings and drawbacks of the prior art.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
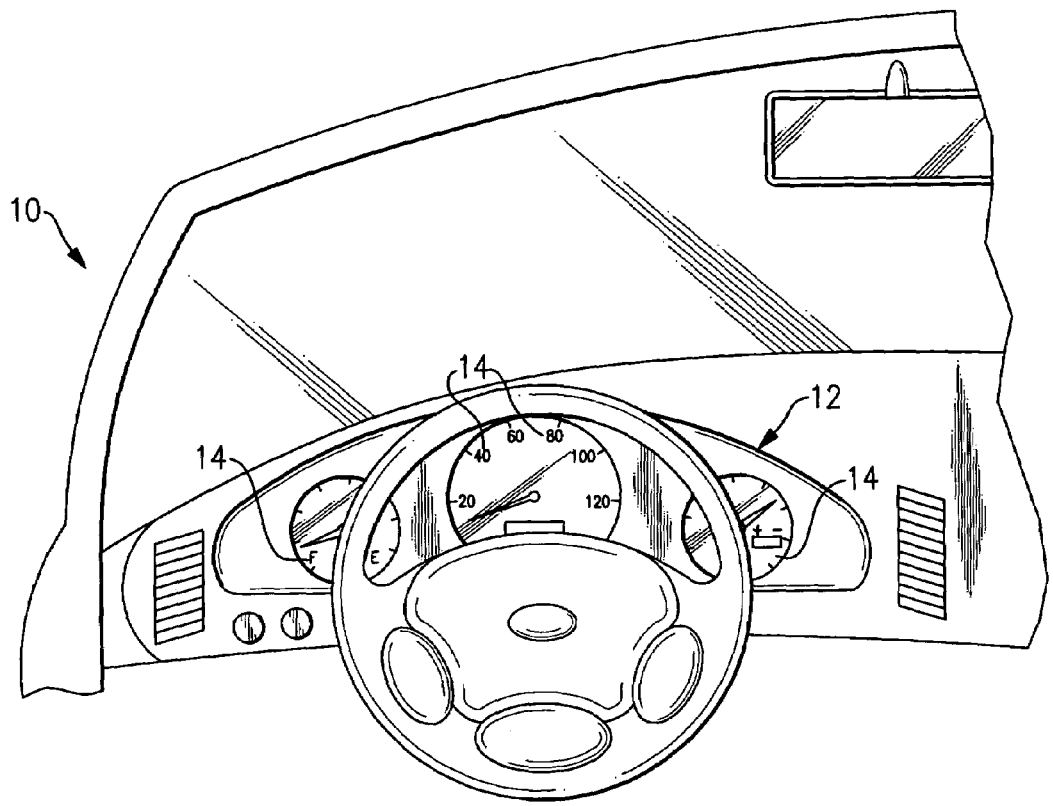
FIG. 1 illustrates selected portions of a vehicle having an example instrument panel according to the present invention.

FIG. 1 illustrates selected portions of a vehicle 10 having an instrument panel 12, such as a vehicle meter cluster, that communicates vehicle information to occupants of the vehicle 10. In the illustrated example, the instrument panel 12 includes vehicle graphics 14, such as numbers, letters, or symbols. At least a portion of the vehicle graphics 14 are illuminated from within the instrument panel 12 for night time viewing or for aesthetic purposes, for example.

Figure 2:
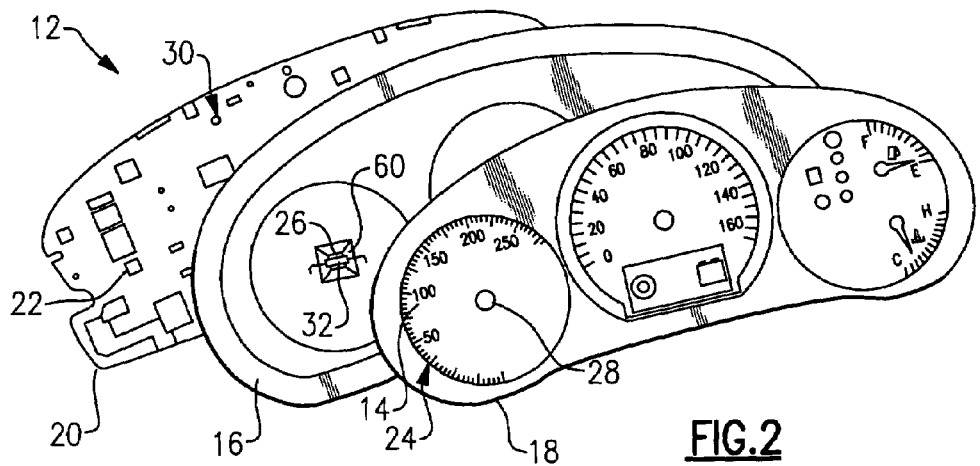
FIG. 2 illustrates an exploded view of an example instrument panel according to the present invention.

FIG. 2 shows an exploded view of selected portions of the example instrument panel 12, including a housing 16 that supports a display surface 18 and a circuit board 20. The circuit board 20 includes a light source 22, such as a light emitting diode (LED), for illuminating the vehicle graphics 14 of a dial 24. When the instrument panel 12 is assembled, the light source 22 aligns with an opening 26 in the housing 16 and with the center 28 of the dial 24. In one example, the light source 22 is at least partially received into the opening 26. In another example, the opening 26 does not receive the light source 22, but light from the light source 22 is received through the opening 26.

A control portion 30 selectively activates the light source 22 in response to an operator-activated switch or an automatic switch, as is known. When activated, the light source 22 emits light. A diffuser member 32 receives the light, and uniformly disperses the light across the dial 24 to evenly illuminate the vehicle graphics 14 of the dial 24.

Figure 4:
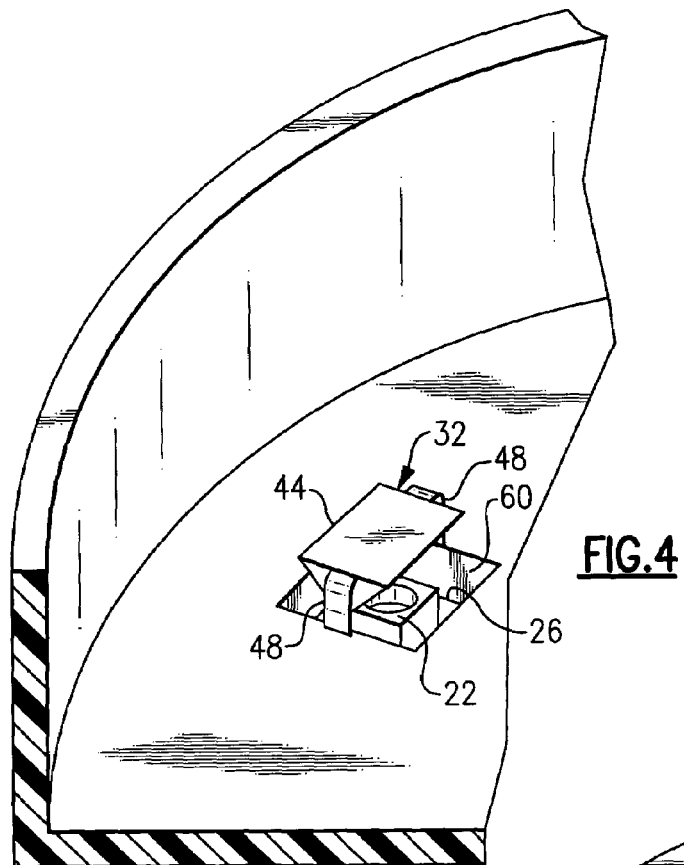
FIG. 4 illustrates a second embodiment of an example diffuser member according to the present invention.
Figure 3:
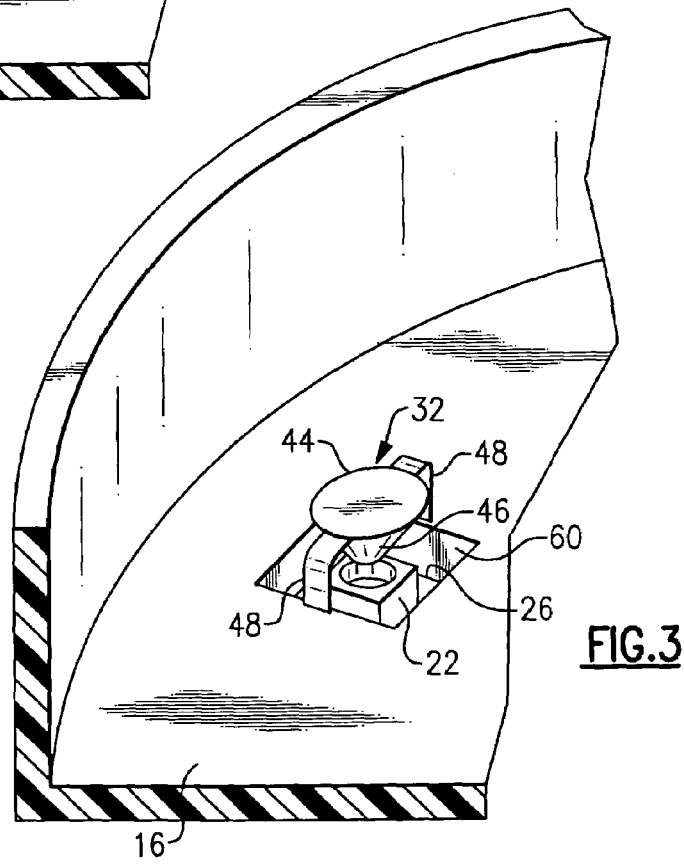
FIG. 3 illustrates a perspective view of an example diffuser member according to the present invention.

FIG. 3 shows selected portions of an example diffuser member 32. In this example, the diffuser member 32 is made of a non-transparent material and has a base portion 44 and a light receiving surface 46. In the illustrated example, the base portion 44 has an elliptical shape and the light receiving surface 46 is conical. In another example, the base portion 44 has a rectangular shape and the light receiving surface 46 has a triangular cross-section, as illustrated in FIG. 4. Given this description, those of ordinary skill in the art will recognize additional diffuser member configurations that meet their particular needs. Attachment portions 48 suspend the diffuser member 32 between the opening 26 and the display surface 18.

In one example, the housing 16 and the diffuser member 32 are integrally formed using an injection molding process such that the housing 18 and the diffuser member 32 are made from the same material. In another example, the housing 16 and diffuser member 32 are made from different materials and are initially separate (i.e., not connected). The diffuser member 32 is then attached to the housing 16 using a soldering, welding, or other method of attachment. Using different materials for the housing 16 and the diffuser member 32 provides the benefit of tailoring the optical properties (e.g., the light reflecting, diffusing, and refracting properties) of each of the housing 16 and the diffuser member 32. In one example, a first material selected for the diffuser member 32 includes relatively high reflectance characteristics compared to a second material that is selected for the housing 16. Given this description, those of ordinary skill in the art will be able to select materials for each of the housing 16 and the diffuser member 32 to meet their particular needs.

Figure 5:
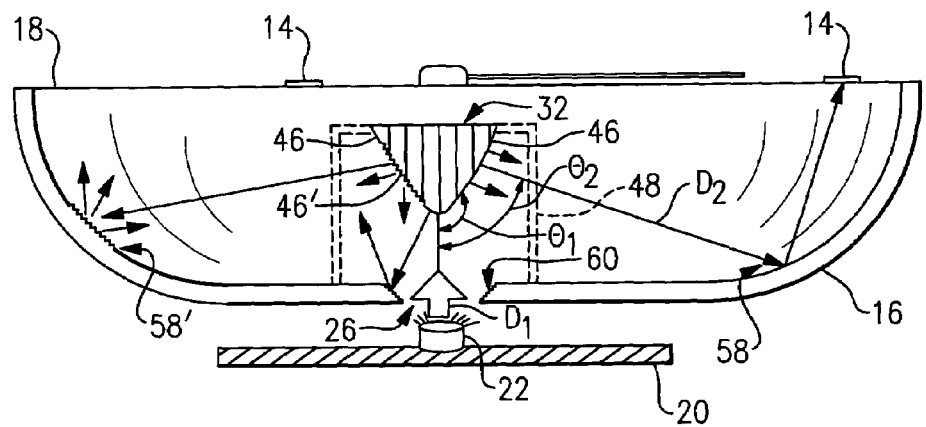
FIG. 5 illustrates a schematic view of an instrument panel during illumination of a vehicle graphic.

FIG. 5 shows a schematic cross-sectional view of the instrument panel 12 during illumination of the vehicle graphics 14. The light source 22 emits light in a direction $D_1$ towards the light receiving surface 46 of the diffuser member 32. The light receiving surface 46 reflects at least a portion of the light in a direction $D_2$ towards a curved surface 58 of the housing 16. In this example, the curved surface 58 is located radially outward from the direction $D_1$. In the illustrated example, the light receiving surface 46 forms an angle $\theta_1$ with the direction $D_1$. In one example, the angle $\theta_1$ is less than 135°. The direction $D_2$ forms an angle $\theta_2$ with the direction $D_1$. In one example, the angle $\theta_2$ is less than 90° and more than 0°. These features provide the benefit of reducing bright spots on the display surface 18 from light that has not been diffused (e.g., light that impinges directly upon the display surface 18 from the light source 22).

In one example, the light receiving surface 46 reflects at least a portion of the light in the direction $D_2$ towards the curved surface 58 of the housing 16. The non-transparent material of the diffuser member 32 in this example allows the light receiving surface 46 to reflect a significant portion of the light in the direction $D_2$.

The curved surface 58 receives the light reflected from the light receiving surface 46 of the diffuser member 32 and reflects at least a portion of the light toward the vehicle graphic 14 of the display surface 18 to illuminate the vehicle graphic 14. The light receiving surface 46 and the curved surface 58 diffuse the light in addition to reflecting the light. That is, a portion of the light is reflected at one angle and other portions of the light are reflected at different angles. In the illustrated example, the area of the curved surface 58 is larger than the area of the light receiving surface 46 to disperse the light over the relatively large area of the display surface 18. This provides the benefit of reflecting and diffusing (i.e., spreading out) light received from the light source 22. Thus, light from a single light source 22 is used to uniformly illuminate a wide area (i.e., the display surface 18).

In the illustrated example, the opening 26 includes side walls 60 that are transverse to the direction $D_1$. The side walls 60 receive light reflected from the light receiving surface 46 of the diffuser member 32 and reflect at least a portion of the light toward the vehicle graphic 14 of the display surface 18 to illuminate the vehicle graphic 14. This provides diffusion of the light in addition to diffusion provided by the curved surface 58 and light receiving surface 46.

In another example, a light receiving surface 46' of the diffuser member 32, a curved surface 58', and the side wall 60 each include a selected surface roughness to enhance the light diffusion characteristics. In one example, the selected surface roughness is formed during fabrication of the diffuser member 32 and/or housing 16, for example by utilizing a textured mold surface in an injection molding operation. The selected surface roughness provides the benefit of at least partially controlling the diffusion characteristics of the diffuser member 32, housing 16, and/or side walls 60. In one example, selecting a relatively large surface roughness increases the light diffusion characteristics (e.g., received light is reflected in many different directions). In another example, selecting a relatively small surface roughness (i.e., a smoother surface) decreases the light diffusion characteristics (e.g., light received is reflected in one or only a few different directions).

Figure 6:
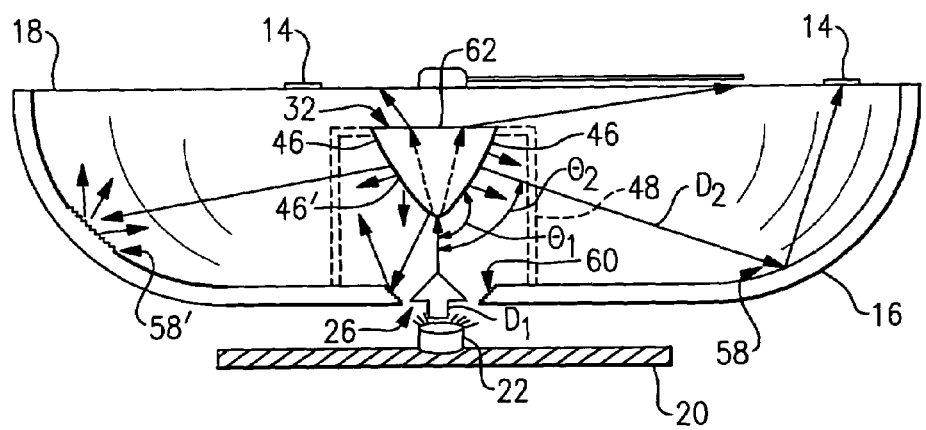
FIG. 6 illustrates another schematic view of an instrument panel during illumination of a vehicle graphic.

In the example shown in FIG. 6, the diffuser member 32 is made of a translucent material or a transparent material (e.g., a material that at least partially transmits light). The diffuser member 32 reflects a portion of the light and refracts a portion of the light at the light receiving surface 46 and at a top surface 62. Upon entering the diffuser member 32 through the light receiving surface 32, the light refracts (i.e., changes direction). Upon exiting the diffuser member 32 through the light receiving surface 32 or the top surface 62, the light again refracts. The changing direction of the light helps to spread the light and illuminate the display surface 18. In another example, the light receiving surface includes a selected surface roughness as described in the example in FIG. 5. Given this description, one of ordinary skill in the art will recognize additional configurations of the light receiving surface to meet their particular needs.

The disclosed examples therefore utilize a single light source 22 to uniformly illuminate the relatively larger area of the display surface 18. This provides the benefit of not having to use additional light sources to achieve even lighting of a vehicle instrument panel. Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A light distributing assembly for a vehicle instrument panel comprising:
    a circuit board;
    a light source in electrical communication with the circuit board, the light source emitting light in a first direction;
    a vehicle display surface that illuminates in response to light received from the light source;
    a diffuser member between the light source and the vehicle display surface, wherein the diffuser member includes a first surface roughness that diffuses the light to produce diffused light; and
    a vehicle instrument panel housing having a surface that reflects at least a portion of the diffused light from the diffuser member toward the vehicle display surface, wherein the surface includes a second surface roughness that is different than the first surface roughness, and wherein the vehicle instrument panel housing includes a beveled opening that receives the light source or the light from the light source.

2. The assembly as recited in claim 1, wherein the diffuser member includes a textured surface that is transverse to the first direction, the textured surface having the first surface roughness.

3. The assembly as recited in claim 2, wherein the textured surface is curved.

4. The assembly as recited in claim 1, wherein the diffuser member includes an attachment portion that suspends the diffuser member adjacent to the light source.

5. The assembly as recited in claim 4, wherein the attachment portion includes at least one arm connecting the diffuser member and the vehicle instrument panel housing.

6. The assembly as recited in claim 5, wherein the at least one arm connects to the vehicle instrument panel housing at a location directly adjacent the beveled opening.

7. The assembly as recited in claim 4, wherein the attachment portion includes a pair of arms each connecting the diffuser member and the vehicle instrument panel housing.

8. The assembly as recited in claim 1, wherein the diffuser member includes a cross-section having a conical shape.

9. The assembly as recited in claim 1, wherein the diffuser member includes a cross-section having a triangular shape.

10. The assembly as recited in claim 1, wherein the diffuser member is made of at least one of a non-transparent plastic material, a transparent plastic material, or a translucent plastic material.

11. The assembly as recited in claim 1, wherein the vehicle instrument panel housing includes housing walls spaced radially outward from the first direction, and the housing walls are curved.

12. The assembly as recited in claim 1, wherein the diffuser member is made of a translucent plastic material that reflects a portion of the light and permits another portion of the light to pass through.

* * * * *

UNITED STATES PATENT AND TRADEMARK OFFICE
CERTIFICATE OF CORRECTION

PATENT NO.      : 7,607,808 B2                                  Page 1 of 1
APPLICATION NO. : 11/126033
DATED           : October 27, 2009
INVENTOR(S)     : Birman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Twelfth Day of October, 2010

David J. Kappos
*Director of the United States Patent and Trademark Office*